(12) United States Patent
Ju

(10) Patent No.: US 11,415,017 B2
(45) Date of Patent: Aug. 16, 2022

(54) ROTOR AND TURBO MACHINE INCLUDING SAME

(71) Applicant: DOOSAN ENERBILITY CO., LTD., Changwon (KR)

(72) Inventor: Eui Jun Ju, Changwon (KR)

(*) Notice: Subject to any disclaimer, the term of this patent is extended or adjusted under 35 U.S.C. 154(b) by 0 days.

(21) Appl. No.: 17/346,312

(22) Filed: Jun. 14, 2021

(65) Prior Publication Data

US 2022/0065120 A1 Mar. 3, 2022

(30) Foreign Application Priority Data

Aug. 28, 2020 (KR) .......................... 10-2020-0109300

(51) Int. Cl.
| | | |
|---|---|---|
| *F16J 15/06* | (2006.01) | |
| *F01D 11/00* | (2006.01) | |
| *F01D 25/28* | (2006.01) | |

(52) U.S. Cl.
CPC ............ *F01D 11/001* (2013.01); *F01D 25/28* (2013.01); *F16J 15/06* (2013.01); *F05D 2240/12* (2013.01); *F05D 2240/55* (2013.01); *F05D 2250/192* (2013.01); *F05D 2260/31* (2013.01)

(58) Field of Classification Search
CPC ...... F01D 11/001; F01D 11/005; F01D 9/023; F01D 9/04; F16J 15/06; F16J 15/02; F16J 15/061; F16J 15/0087; F05D 2240/55
See application file for complete search history.

(56) References Cited

U.S. PATENT DOCUMENTS

| | | | | |
|---|---|---|---|---|
| 8,398,090 | B2* | 3/2013 | McMahan ............ | F16J 15/0887 277/643 |
| 9,790,809 | B2* | 10/2017 | Dube ...................... | F01D 25/04 |
| 2017/0218784 | A1* | 8/2017 | Feldmann ............... | F01D 9/041 |
| 2018/0291768 | A1* | 10/2018 | Boeck ................... | F01D 25/243 |

FOREIGN PATENT DOCUMENTS

| | | |
|---|---|---|
| CN | 107939455 A | 4/2018 |
| JP | 2648816 B2 | 9/1997 |
| JP | 2013194899 A | 9/2013 |
| KR | 1020090083508 A | 8/2009 |

* cited by examiner

*Primary Examiner* — Christopher Verdier
*Assistant Examiner* — Maxime M Adjagbe
(74) *Attorney, Agent, or Firm* — Harvest IP Law, LLP

(57) ABSTRACT

A sealing assembly for sealing a gap between a first component and a second component is provided. The sealing assembly includes a sealing body disposed between the first component and the second component and a pressing member disposed between the sealing body and the second component, configured to press the sealing body toward the first component, and configured to extend and compress in a circumferential direction of the first component.

18 Claims, 5 Drawing Sheets

ROTOR AND TURBO MACHINE INCLUDING SAME

CROSS REFERENCE TO RELATED APPLICATION

This application claims priority to Korean Patent Application No. 10-2020-0109300, filed on Aug. 28, 2020, the disclosure of which is incorporated herein by reference in its entirety.

BACKGROUND

1. Field

Apparatuses and methods consistent with exemplary embodiments relate to a sealing assembly and a turbo machine including the same sealing assembly, and more particularly, to a sealing assembly for sealing a gap between a first component and a second component in a turbo machine and a turbo machine including the same sealing assembly.

2. Description of the Related Art

A turbo machine refers to a device that generates a driving force used to generate electric power with a fluid (e.g., gas) passing through the turbo machine. Therefore, a turbo machine and a generator are usually installed and used together. Examples of the turbo machine include gas turbines, steam turbines, and wind power turbines. A gas turbine mixes compressed air and natural gas and burns the mixture to generate combustion gas that is used to generate a driving force for generation of electric power. A steam turbine heats water to generate steam that is used to generate a driving force for generation of electric power. A wind turbine converts wind power into a driving force for generation of electric power.

The gas turbine includes a compressor section, a combustor section, and a turbine section. The compressor section includes compressor vanes and compressor blades that are alternately arranged in a compressor casing. The compressor section compresses air introduced into the compressor casing by the compressor vanes and the compressor blades while passing through the compressor section. The combustor section mixes the compressed air produced by the compressor section with fuel and ignites the fuel-air mixture with an igniter to generate hot pressurized combustion gas. The hot pressurized combustion gas is supplied to the turbine section. The turbine section includes a plurality of turbine vanes and a plurality of turbine blades that are alternately arranged in a turbine casing. The turbine blades are rotated by the combustion gas to generate power and the combustion gas flows out of the turbine casing through a turbine diffuser.

The steam turbine includes an evaporator and a turbine. The evaporator generates steam by heating water that is externally supplied. The turbine of the steam turbine includes a plurality of turbine vanes and a plurality of turbine blades that are alternately arranged in a turbine casing. While the turbine of the steam turbine uses the steam generated by the evaporator as a driving force for rotating the turbine blades, the turbine of the gas turbine uses the combustion gas.

In either case, the turbine includes a turbine stator and a turbine rotor which is installed in the turbine stator. The turbine stator includes a turbine casing, a vane carrier disposed inside the turbine casing in a radial direction, and turbine vanes coupled to an inner circumferential surface of the vane carrier. The turbine rotor includes a turbine disk and turbine blades coupled to an outer circumferential surface of the turbine disk.

Combustion gas or steam flows through the inside of the vane carrier. The flow of combustion gas or steam supplies the kinetic energy to rotate the turbine blades of the turbine rotor with the help of the turbine vanes disposed inside the vane carrier. Because the conversion efficiency of the combustion gas or steam from the thermal energy to the kinetic energy is inversely proportional to an amount of leakage of the fluid, the fluid is required to flow only along an intended flow path in the vane carrier and the leakage of the fluid from the vane carrier must be minimized. To minimize the leakage, it is important to tightly seal a gap between the vane carriers adjacent to each other in an axial direction of the turbine casing.

SUMMARY

Aspects of one or more exemplary embodiments provide a sealing assembly capable of hermetically sealing a gap between vane carriers adjacent to each other in an axial direction of a turbine casing and provide a turbo machine including the same sealing assembly.

Additional aspects will be set forth in part in the description which follows and, in part, will become apparent from the description, or may be learned by practice of the exemplary embodiments.

According to an aspect of an exemplary embodiment, there is provided a sealing assembly for sealing a gap between a first component and a second component, the sealing assembly including: a sealing body disposed between the first component and the second component; and a pressing member disposed between the sealing body and the second component, configured to press the sealing body toward the first component, and configured to extend and compress in a circumferential direction of the first component.

According to an aspect of another exemplary embodiment, there is provided a turbo machine including a stator configured to guide fluid flowing through an inside thereof and a rotor disposed in the stator and rotated by the fluid flowing through the inside of the stator. The stator may include a casing, first and second vane carriers positioned inside the casing in a radial direction of the casing and disposed adjacent to each other in an axial direction of the casing, a plurality of vanes coupled to the respective inner circumferential surfaces of the first and second vane carriers, and a sealing assembly configured to seal a gap between the first vane carrier and the second vane carrier. The sealing assembly may include a sealing body disposed between the first vane carrier and the second vane carrier and a pressing member disposed between the sealing body and the second vane carrier, configured to extend and compress in a circumferential direction of the first vane carrier, and configured to press the sealing body toward the first vane carrier.

The second vane carrier may include a sealing groove on a first-side surface facing the first vane carrier, the sealing body may be inserted into the sealing groove, and the pressing member may be inserted into the sealing groove and disposed on an opposite side of the first vane carrier with the sealing body interposed therebetween.

The sealing body may include a recess extending in the circumferential direction and formed on a second-side surface facing the second vane carrier, and the pressing member may be installed in the recess.

The pressing member may include: a first pressing portion fixed to the sealing body; a second pressing portion spaced from the first pressing member in the circumferential direction of the first vane carrier and installed to move along a surface of the sealing body in the circumferential direction; and a third pressing portion connected to both ends of the first pressing portion and the second pressing portion.

The sealing assembly may further include a fixing member installed to extend through the first pressing portion and the sealing body to fix the first pressing portion to the sealing body.

The third pressing portion may convexly protrude convexly in a first direction away from the sealing body such that a distal end of the third pressing portion in the first direction is farthest from the sealing body in a middle portion of the third pressing portion in the circumferential direction and closest to the sealing body at both ends of the third pressing portion in the circumferential direction.

The sealing body may include a cord groove formed in a radially outer end portion and extending in the circumferential direction, and the sealing assembly may further include a cord seal seated in the cord groove, extending in a circumferential direction of the sealing body, and installed to contact a radially outer-side inner wall of the sealing groove.

The sealing assembly may further include a protrusion protruding outward from the sealing body in the radial direction, and the cord groove may be formed in a radially outer portion of the protrusion.

The sealing body may have a chamfered surface on a radially outer portion of a first-side surface thereof facing the first vane carrier.

The sealing body may have a chamfered surface on a radially outer portion of a first-side surface thereof facing the first vane carrier, and the protrusion may be spaced from the chamfered surface and disposed on a side of the second vane carrier.

In the sealing assembly and the turbo machine according to one or more exemplary embodiments, the sealing body is installed between the first vane carrier (corresponding to the first component) and the second vane carrier (corresponding to the second component), a length of the pressing member in the circumferential direction of the turbine casing is designed to be variable, and the pressing member presses the sealing body toward the first vane carrier when the pressing member is installed between the sealing body and the second vane carrier. Therefore, if the gap between the first vane carrier and the second vane carrier increases during operation of the device, the pressing member presses the sealing body toward the first vane carrier to reduce the gap so that the sealing body and the first vane carrier can remain in contact with each other. That is, even during operation of the device, the gap between the first vane carrier and the second vane carrier can be consistently hermetically sealed by the sealing assembly.

According to one or more exemplary embodiments, it is possible to tightly seal the gap between the first vane carrier and the second vane carrier with a simplified sealing structure and to easily maintain the sealing structure. Moreover, it is possible to stably maintain the sealing performance of the sealing structure while accommodating deformation due to thermal expansion of the sealing structure.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
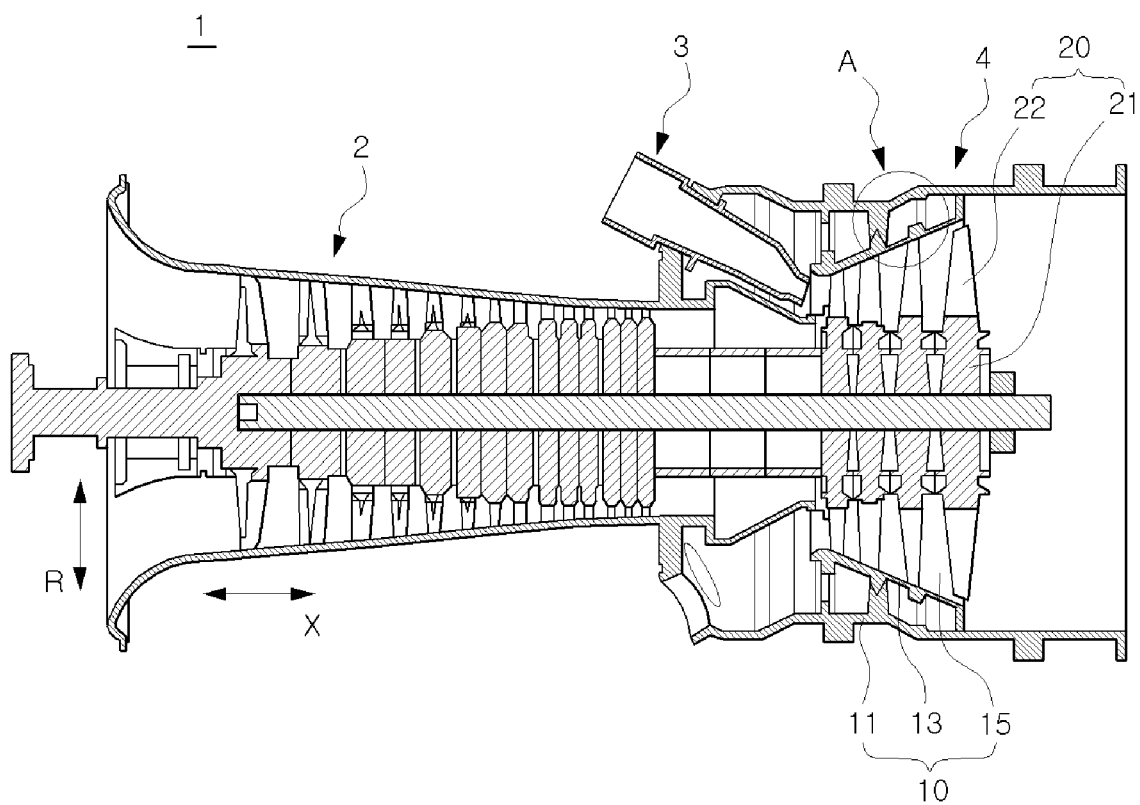
FIG. 1 is a diagram illustrating a gas turbine according to an exemplary embodiment.

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

The terminology used herein is for the purpose of describing particular embodiments only and is not intended to limit the scope of the disclosure. As used herein, the singular forms "a", "an", and "the" are intended to include the plural forms as well, unless the context clearly indicates otherwise. In this specification, terms such as "comprise", "include", or "have/has" should be construed as designating that there are such features, integers, steps, operations, elements, components, and/or a combination thereof in the specification, not to exclude the presence or possibility of adding one or more of other features, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a sealing assembly and a turbo machine including the sealing assembly according to an exemplary embodiment will be described with reference to the accompanying drawings. In order to clearly illustrate the disclosure in the drawings, some of the elements that are not essential to the complete understanding of the disclosure may be omitted, and like reference numerals refer to like elements throughout the specification. Throughout the description, a gas turbine is assumed to be a turbo machine according to exemplary embodiments. However, this is only illustrative. For example, a turbo machine may be a steam turbine.

FIG. 1 is a diagram illustrating a gas turbine according to an exemplary embodiment. Referring to FIG. 1, a gas turbine 1 includes a compressor 2, a combustor 3, and a turbine 4. In a flow direction of gas (for example, compressed air or combustion gas) in the gas turbine 1, the compressor 2 is disposed on an upstream side and the turbine 4 is disposed on a downstream side. The combustor 3 is disposed between the compressor 2 and the turbine 4.

The compressor 2 includes compressor vanes and compressor rotors in a compressor casing, and the turbine 4 includes turbine vanes 15 and turbine rotors 20 in a turbine casing 11. The compressor vanes and the compressor rotors are arranged in multiple stages along a flow direction of compressed air, and the turbine vanes 15 and the turbine rotors 20 are arranged in multiple stages along a flow direction of combustion gas. The compressor 2 has an internal space of which volume decreases from a front stage toward a rear stage so that the introduced air can be compressed while passing through the inside of the compressor 2. On the contrary, the turbine 4 has an internal space of which volume increases from a front stage toward a rear stage so that the introduced combustion gas can expand while passing through the inside of the turbine 4.

In addition, a torque tube serving as a torque transmission member is disposed between the last-stage compressor rotor of the compressor 2 and the first-stage turbine rotor of the turbine 4 to transfer the torque generated by the turbine 4 to the compressor 2. Although the torque tube may include a plurality of torque tube disks arranged in three stages as illustrated in FIG. 1, this is only an example, and the torque tube may include torque tube disks arranged in four or more stages or two or fewer stages.

The compressor rotor includes a compressor disk and compressor blades. A plurality of compressor disks may be disposed in the compressor casing, and each of the compressor disks is fastened by a tie road so as not to be separated from each other in an axial direction of the compressor 2. That is, each of the compressor disks is arranged in the axial direction with the tie rod extending through centers of the compressor disks. In addition, adjacent compressor disks are arranged such that opposing surfaces of the adjacent compressor disks are pressed against each other by the tie rod so that the compressor disks cannot rotate relative to each other.

The plurality of compressor blades are radially coupled to an outer circumferential surface of the compressor disk in a multi-stage. Further, a plurality of compressor vanes are arranged in a multi-stage on an inner circumferential surface of the compressor casing to form an annular shape as a whole and are alternately arranged with the plurality of compressor blades. While the compressor rotor disks rotate along with a rotation of the tie rod, the compressor vanes fixed to the compressor casing do not rotate. The compressor vanes guide the flow of compressed air moved from front-stage compressor blade to rear-stage compressor blade. Here, the compressor casing and the compressor vanes will be collectively defined as a compressor stator to be distinguished from the compressor rotor.

The tie rod is installed to extend through the centers of the plurality of compressor disks and the plurality of turbine disks. One end of the tie rod is fastened to the compressor disk located on a foremost upstream in the compressor, and the other end is fastened by a fixing nut.

Because the shape of the tie rod varies according to the type of a gas turbine, the shape of the tie rod is not limited to the example illustrated in FIG. 1. There are three types of tie rods: a single-type in which a single tie rod extends through the centers of the compressor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases the pressure of fluid flowing into the combustor and adjusts the flow angle of the fluid to be substantially equal to the designed flow angle.

The combustor 3 mixes the introduced compressed air with fuel and burns the air-fuel mixture to produce high-temperature and high-pressure combustion gas. The combustor 3 increases, through a constant pressure combustion process, the temperature of the combustion gas to a heat-resistant temperature by which components of the combustor and the components of the turbine can endure.

A plurality of combustors constituting the combustion system of the gas turbine 1 are provided in a form of a cell in a combustor casing. Each combustor includes a nozzle for injecting fuel, a liner defining a combustion chamber, and a transition piece serving as connector between the combustion chamber and the turbine.

The liner defines the combustion chamber in which the fuel injected through the fuel injection nozzle and the compressed air fed from the compressor are mixed and burned. That is, the liner includes a combustion chamber (i.e., a space for combustion) in which the fuel-air mixture is combusted and a liner annular flow passage that is an annular space surrounding the combustion chamber. The nozzle for injecting fuel is installed at a front end of the liner, and an igniter is installed in a wall of the liner.

In the liner annular flow passage, compressed air introduced through a plurality of holes formed in an outer wall flows, and compressed air that cooled the transition piece also flows. Therefore, as the compressed air flows along the outer wall of the liner, it is possible to prevent the liner from being thermally damaged by high temperature combustion gas.

The transition piece is coupled to a rear end (i.e., downstream end) of the liner to deliver the combustion gas toward the turbine. The transition piece has a transition piece annular flow passage surrounding an internal space of the transition piece, and compressed air flowing through the transition piece annular flow passage cools an outer surface of the transition piece, thereby protecting the transition piece against thermal damage attributable to the high temperature of the combustion gas.

The high-temperature and high-pressure combustion gas supplied to the turbine 4 expands while passing through the inside of the turbine 4. The expansion of the combustion gas causes impulse and reaction forces with respect to the turbine blades 22, thereby generating torque. The torque is transferred to the compressor 2 through the torque tube described above, and an excessive portion of the torque exceeding the power required to driving the compressor 2 is used to drive a generator or the like.

The turbine 4 is basically similar in structure to the compressor 2. That is, the turbine 4 includes a plurality of turbine rotors 20 similar to the compressor rotors of the compressor 2. Each turbine rotor 20 includes a turbine disk 21 and a plurality of turbine blades 22 radially coupled to an outer surface of the turbine disk 21. For each turbine stage, a plurality of turbine vanes 15 are radially coupled to an inner surface of the turbine casing 11 and are arranged in the circumferential direction. The turbine vanes 15 are alternately arranged with the turbine blades 22. The turbine vanes 15 guide the flow of the combustion gas passing through the turbine blades 22. Here, the turbine casing 11 and the turbine vanes 15 will be collectively defined as a turbine stator 10 to be distinguished from the turbine rotor 20.

Hereinafter, for convenience of description, reference character C denotes a circumferential direction of the turbine casing 11, reference character R denotes a radial direction of the turbine casing 11, and reference character X denotes an axial direction of the turbine casing 11 and serves a rotation center. Here, reference character X also denotes a longitudinal direction of the tie rod illustrated in FIG. 1.

Figure 2:
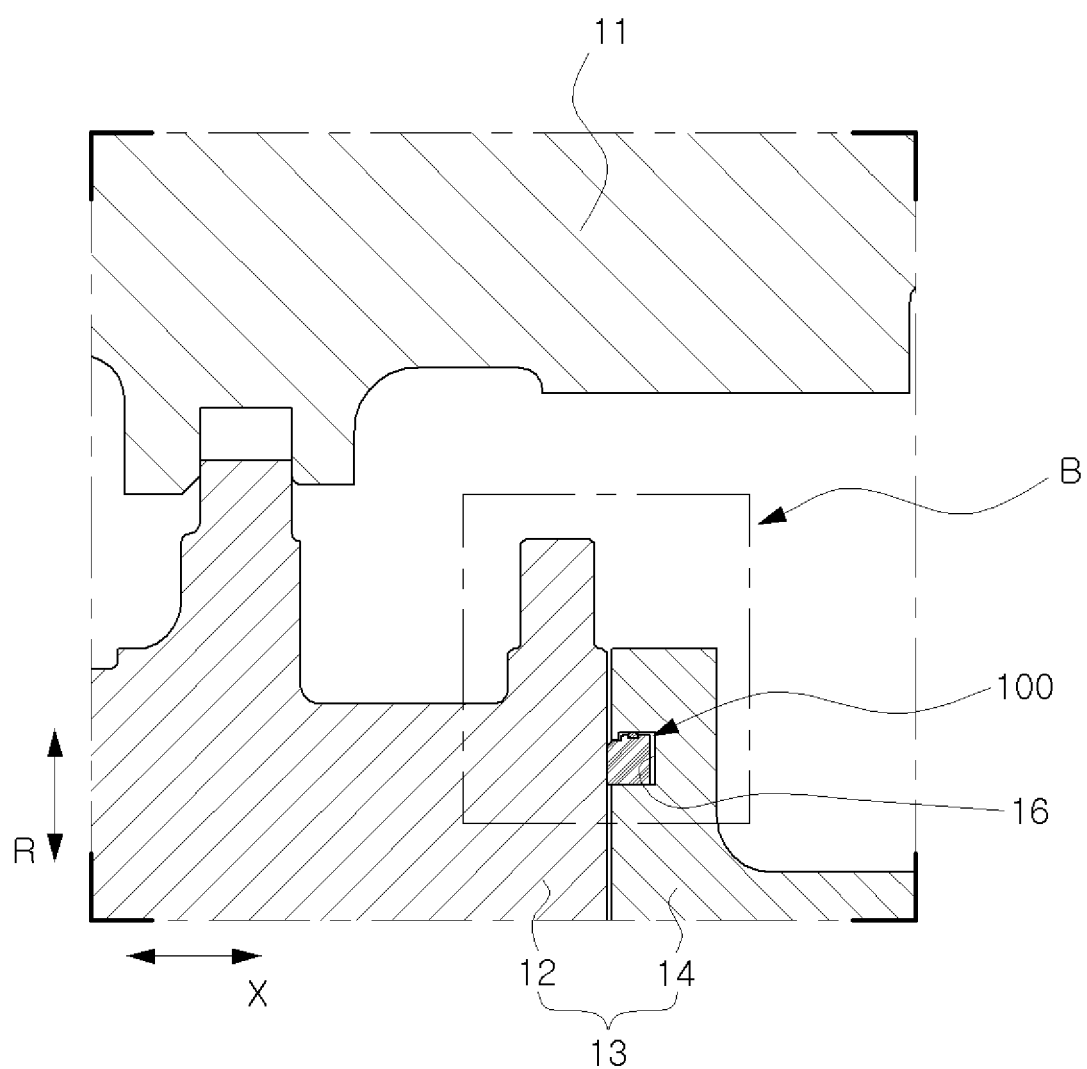
FIG. 2 is an enlarged view of portion A in FIG. 1 for illustrating a state in which a sealing assembly according to an exemplary embodiment is installed between a first vane carrier and a second vane carrier.
Figure 3:
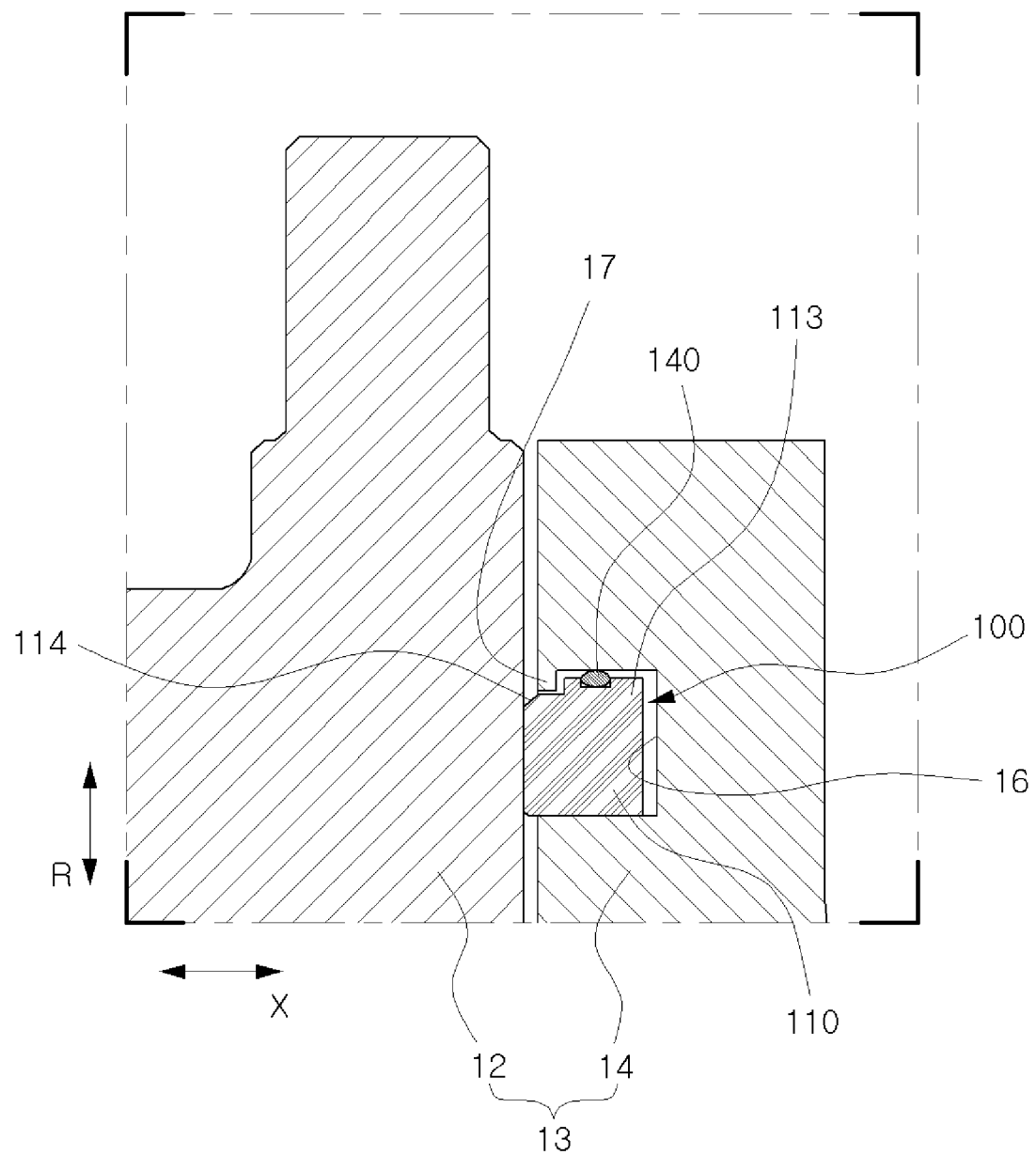
FIG. 3 is an enlarged view of portion B in FIG. 2.
Figure 4:
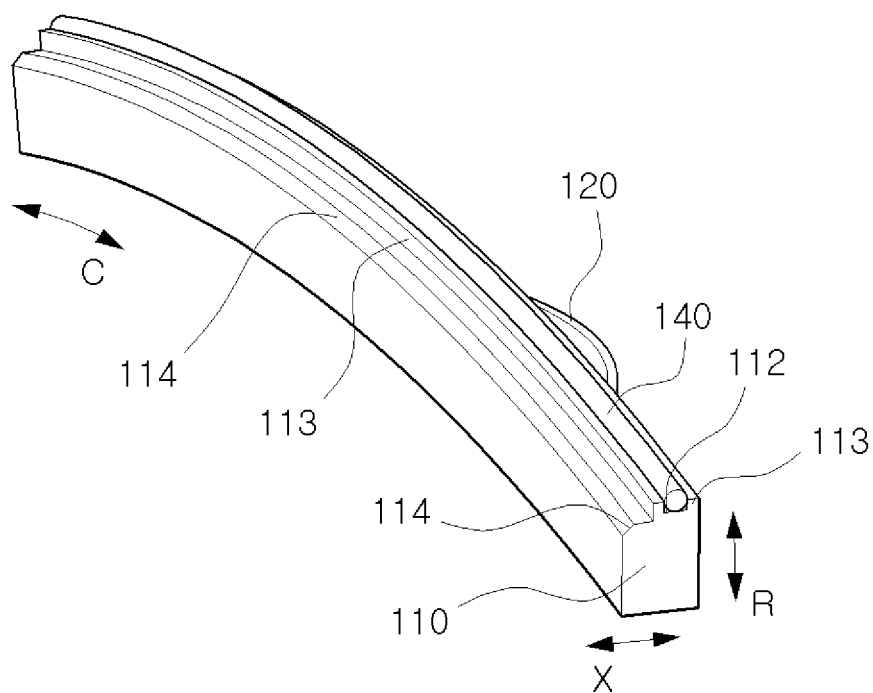
FIG. 4 is a perspective view illustrating the sealing assembly viewed from one direction according to an exemplary embodiment.
Figure 5:
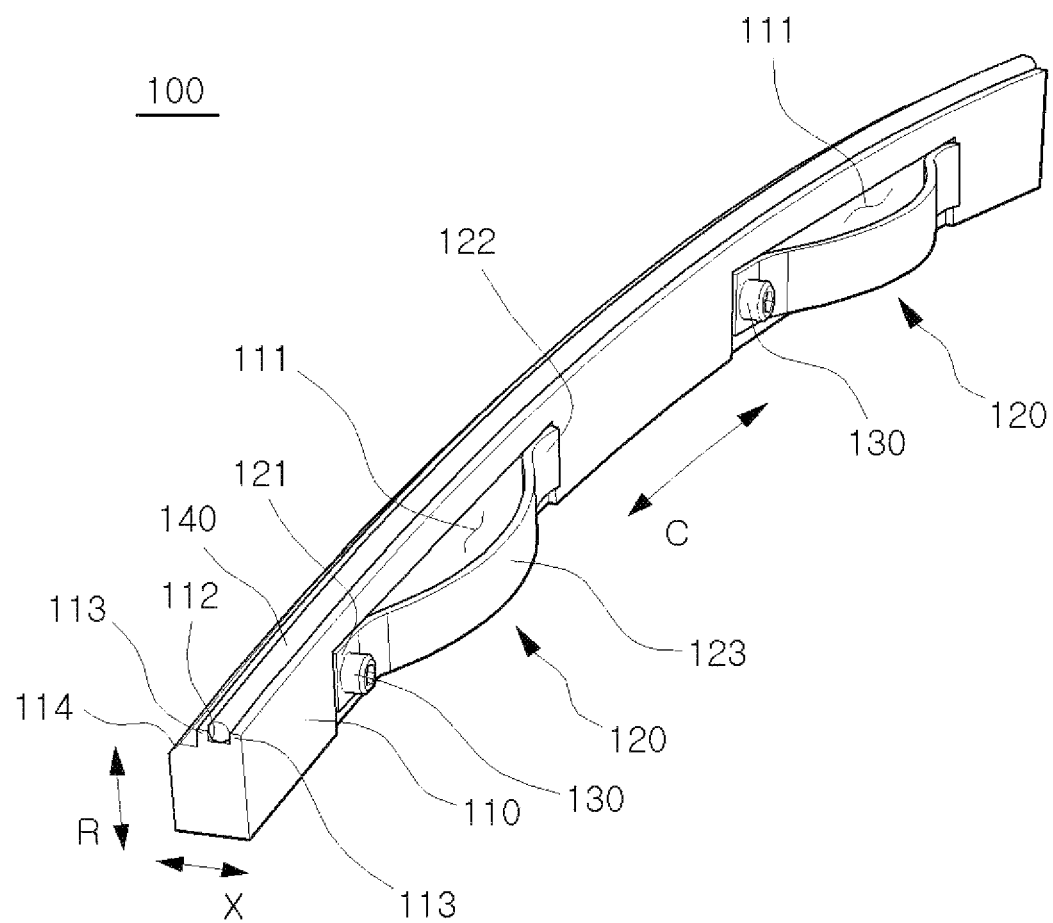
FIG. 5 is a perspective view illustrating the sealing assembly viewed in another direction according to an exemplary embodiment.

FIG. 2 is an enlarged view of portion A in FIG. 1 for illustrating a state in which a sealing assembly according to an exemplary embodiment is installed between a first vane carrier and a second vane carrier. FIG. 3 is an enlarged view of portion B in FIG. 2. FIG. 4 is a perspective view illustrating the sealing assembly viewed from one direction according to an exemplary embodiment. FIG. 5 is a perspective view illustrating the sealing assembly viewed in another direction according to an exemplary embodiment.

Referring to FIGS. 2 and 3, the turbine stator 10 includes a vane carrier 13, a sealing assembly 100, the turbine casing 11, and the turbine vanes 15.

The vane carrier 13 includes a first vane carrier 12 and a second vane carrier 14 that are located inside in the radial direction R of the turbine casing 11 and are arranged adjacent to each other in the axial direction X. The turbine vane 15 is coupled to an inner circumferential surface of the first vane carrier 12 and the second vane carrier 14.

The sealing assembly 100 serves to seal a gap between a first component and a second component. For example, the first component and the second component correspond to the first vane carrier 12 and the second vane carrier 14, respectively. However, this is only an example, and the first and second components may correspond to other components of the gas turbine 1.

Referring to FIGS. 2 to 5, the sealing assembly 100 includes a sealing body 110, a pressing member 120, a fixing member 130, and a cord seal 140.

The sealing body 110 is disposed between the first vane carrier 12 and the second vane carrier 14 and is elongated along the circumferential direction C. The sealing body 110 may include a plurality of sealing body units arranged to be in contact with each other in the circumferential direction C. In this case, the plurality of sealing body units as a whole form a ring shape.

The pressing member 120 is installed between the sealing body 110 and the second vane carrier 14. The pressing member 120 is designed to vary in length (i.e., size in the axial direction) along the circumferential direction C and presses the sealing body 110 toward the first vane carrier 12.

Here, a side of the sealing assembly 100 on which the first vane carrier 12 is installed is referred to as a first side, and a side of the sealing assembly 100 on which the second vane carrier 14 is installed is referred to as a second side.

The second vane carrier 14 has a sealing groove 16 on a first side surface thereof which is on the side of the first vane carrier 12. The sealing body 110 and the pressing member 120 are inserted into the sealing groove 16. Referring to FIG. 5, the pressing member 120 is disposed on the second side of the sealing body 110. That is, the pressing member 120 is disposed on the opposite side of the first vane carrier 12. In detail, the sealing body 110 has a recess 111 concavely formed on the second side surface of the sealing body 110. The recess 111 is elongated along the circumferential direction C. For example, the recess 111 may include a plurality of recesses spaced apart from each other in the circumferential direction C. The pressing member 120 may include a plurality of pressing members, and the plurality of pressing members 120 are installed in each of the recesses 111.

Referring to FIG. 5, each of the plurality of pressing members 120 may include a first pressing portion 121, a second pressuring portion 122, and a third pressing portion 123.

The first pressing portion 121 is fixed to an end portion of a bottom of the recess 111. The fixing member 130 extends from the second side surface of the first pressing portion 121 and sequentially passes through the first pressing portion 121 and the sealing body 110 to fix the first pressing portion 121 to the sealing body 110.

Each of the second pressing portions 122 is received in a corresponding one of the recesses 111 and is spaced apart from the first pressing portion 121 in the circumferential direction C. The second pressing portion 122 has a free end capable of sliding along the bottom surface of the recess 111 in the circumferential direction C.

The third pressing portion 123 is a middle portion between the first pressing portion 121 and the second pressing portion 122 and is continuous to the first pressing portion 121 and the second pressing portion 122. The third pressing portion 123 protrudes convexly in the axial direction X such that a central portion protrudes the most and end portions respectively connected to the first pressing portion 121 and the second pressing portion 122 protrude the least. The third pressing portion 123 is installed to be in contact with a second-side inner surface of the sealing groove 16 to press the sealing body 110 toward the first vane carrier 12. The third pressuring portion 123 is made of an elastic material so that the length thereof in the circumferential direction C is variable. That is, the third pressing portion 123 can be stretched or compressed in the circumferential direction C.

If the sealing assembly 100 is installed between the first vane carrier 12 and the second vane carrier 14, the pressing member 120 is installed in the sealing groove 16 in a state in which the pressing member 120 is fully extended in the circumferential direction C and is pressed toward the sealing body 110 in the axial direction X. If the gap between the first vane carrier 12 and the second vane carrier 14 increases during operation of the device, the pressing member 120 is compressed in the circumferential direction C to press the sealing body 110 toward the side of the first vane carrier 12. Therefore, the sealing body 110 can remain in contact with the first vane carrier 12.

Therefore, because the pressing member 120 presses the sealing body 110 toward the first vane carrier 12 so that the sealing body 110 and the first vane carrier 12 can remain in contact with each other, the gap between the first vane carrier 12 and the second vane carrier 14 remains consistently hermetically sealed by the sealing assembly 100 during operation of the device. The sealing assembly 100 according to the exemplary embodiment can tightly seal the gap between the first vane carrier 12 and the second vane carrier 14 with a simplified structure and facilitate the maintenance thereof easier. Moreover, the sealing assembly 100 can stably maintain sealing performance while accommodating deformation due to thermal expansion.

Referring to FIGS. 2 to 5, the sealing body 110 has a cord groove 112 at an outer end thereof in the radial direction R. The cord groove 112 is elongated in the circumferential direction C. The cord seal 140 is seated in the cord groove 112 and is elongated in the circumferential direction C. The cord seal 140 is positioned to contact an outer-side inner wall of the sealing groove 16 among the outer-side inner wall and an inner-side inner wall of the sealing groove 16 in the radial direction R. Accordingly, the sealing body 110 and the pressing member 120 work in conjunction with each other to seal the gap between the first vane carrier 12 and the second vane carrier 14 in the axial direction X, and the cord seal 140 seals the gap between the first vane carrier 12 and the second vane carrier 14 in the radial direction R. FIGS. 4 and 5 illustrate the cord seal 140 having a circular cross section, but it is understood that this is only an example and other exemplary embodiments are not limited thereto. For example, the cord seal 140 may have a polygonal cross section.

Referring to FIGS. 4 and 5, the sealing body 110 has a protrusion 113 protruding outward in the radial direction R, and the cord groove 112 is formed in an outer portion of the protrusion 113 in the radial direction R. In addition, the sealing body 110 has a chamfered surface 114 on an outer portion thereof in the radial direction. Therefore, when the sealing body 110 and the pressing member 120 are installed between the first vane carrier 12 and the second vane carrier 14, they can be pressed to the side of the second vane carrier 14 without physical damage. On the other hand, the protrusion 113 is spaced from the chamfered surface 114 and is disposed on the second side of the sealing body 110, while the chamfered surface 114 is disposed on the first side of the sealing body 110. A sealing protrusion 17 protrudes inward from the outer-side inner wall of the sealing groove 16 in the radial direction R, and is positioned between the chamfered surface 114 and the protrusion 113.

While one or more exemplary embodiments have been described with reference to the accompanying drawings, it is to be understood by those skilled in the art that various modifications and changes in form and details may be made therein without departing from the spirit and scope as defined by the appended claims. Accordingly, the description of the exemplary embodiments should be construed in a descriptive sense only and not to limit the scope of the claims, and many alternatives, modifications, and variations will be apparent to those skilled in the art.

What is claimed is:

1. A sealing assembly for sealing a gap between a first component and a second component, the sealing assembly comprising:
   a sealing body disposed between the first component and the second component; and
   a pressing member disposed between the sealing body and the second component, configured to press the sealing body toward the first component, and configured to extend and compress in a circumferential direction of the first component,
   wherein the sealing body includes a recess extending in the circumferential direction and formed on a second-side surface facing the second component, and the pressing member is installed in the recess.

2. The sealing assembly according to claim 1, wherein the second component includes a sealing groove on a first-side surface facing the first component,
   the sealing body is inserted into the sealing groove, and
   the pressing member is inserted into the sealing groove and disposed on an opposite side of the first component with the sealing body interposed therebetween.

3. The sealing assembly according to claim 1, wherein the pressing member comprises:
   a first pressing portion fixed to the sealing body;
   a second pressing portion spaced from the first pressing member in the circumferential direction of the first component and installed to move along a surface of the sealing body in the circumferential direction; and
   a third pressing portion connected to both ends of the first pressing portion and the second pressing portion.

4. The sealing assembly according to claim 3, further comprising a fixing member installed to extend through the first pressing portion and the sealing body to fix the first pressing portion to the sealing body.

5. The sealing assembly according to claim 3, wherein the third pressing portion protrudes convexly in a first direction away from the sealing body such that a distal end of the third pressing portion in the first direction is farthest from the sealing body in a middle portion of the third pressing portion in the circumferential direction and closest to the sealing body at both ends of the third pressing portion in the circumferential direction.

6. The sealing assembly according to claim 2, wherein the sealing body includes a cord groove formed in a radially outer end portion and extending in the circumferential direction, and
   the sealing assembly further comprises a cord seal seated in the cord groove, extending in a circumferential direction of the sealing body, and installed to contact a radially outer-side inner wall of the sealing groove.

7. The sealing assembly according to claim 6, further comprising a protrusion protruding outward from the sealing body in the radial direction,
   wherein the cord groove is formed in a radially outer portion of the protrusion.

8. The sealing assembly according to claim 1, wherein the sealing body has a chamfered surface on a radially outer portion of a first-side surface thereof facing the first component.

9. The sealing assembly according to claim 7, wherein the sealing body has a chamfered surface on a radially outer portion of a first-side surface thereof facing the first component, and
   the protrusion is spaced from the chamfered surface and disposed on a side of the second component.

10. A turbo machine comprising:
    a stator configured to guide fluid flowing through an inside thereof; and
    a rotor disposed in the stator and rotated by the fluid flowing through the inside of the stator,
    wherein the stator comprises a casing, first and second vane carriers positioned inside the casing in a radial direction of the casing and disposed adjacent to each other in an axial direction of the casing, a plurality of vanes coupled to the respective inner circumferential surfaces of the first and second vane carriers, and a sealing assembly configured to seal a gap between the first vane carrier and the second vane carrier, and
    wherein the sealing assembly comprises a sealing body disposed between the first vane carrier and the second vane carrier and a pressing member disposed between the sealing body and the second vane carrier, configured to extend and compress in a circumferential direction of the first vane carrier, and configured to press the sealing body toward the first vane carrier,
    wherein the sealing body includes a recess extending in the circumferential direction and formed on a second-side surface facing the second vane carrier, and the pressing member is installed in the recess.

11. The turbo machine according to claim 10, wherein the second vane carrier includes a sealing groove on a first-side surface facing the first vane earner,
    the sealing body is inserted into the sealing groove, and the pressing member is inserted into the sealing groove and disposed on an opposite side of the first vane carrier with the sealing body interposed therebetween.

12. The turbo machine according to claim 10, wherein the pressing member comprises:
- a first pressing portion fixed to the sealing body;
- a second pressing portion spaced from the first pressing member in the circumferential direction of the first vane carrier and installed to move along a surface of the sealing body in the circumferential direction; and
- a third pressing portion connected to both ends of the first pressing portion and the second pressing portion.

13. The turbo machine according to claim 12, further comprising a fixing member installed to extend through the first pressing portion and the sealing body to fix the first pressing portion to the sealing body.

14. The turbo machine according to claim 12, wherein the third pressing portion protrudes convexly in a first direction away from the sealing body such that a distal end of the third pressing portion in the first direction is farthest from the sealing body in a middle portion of the third pressing portion in the circumferential direction and closest to the sealing body at both ends of the third pressing portion in the circumferential direction.

15. The turbo machine according to claim 11, wherein the sealing body includes a cord groove formed in a radially outer end portion and extending in the circumferential direction, and
- the sealing assembly further comprises a cord seal seated in the cord groove, extending in a circumferential direction of the sealing body, and installed to contact a radially outer-side inner wall of the sealing groove.

16. The turbo machine according to claim 15, further comprising a protrusion protruding outward from the sealing body in the radial direction,
- wherein the cord groove is formed in a radially outer portion of the protrusion.

17. The turbo machine according to claim 10, wherein the sealing body has a chamfered surface on a radially outer portion of a first-side surface thereof facing the first vane carrier.

18. The turbo machine according to claim 16, wherein the sealing body has a chamfered surface on a radially outer portion of a first-side surface thereof facing the first vane carrier, and
- the protrusion is spaced from the chamfered surface and disposed on a side of the second vane carrier.

* * * * *